FIG. I

Inventor
CLARKE M. GILBERT

Oct. 25, 1949.  C. M. GILBERT  2,486,357
REMOTE CONTROL SYSTEM
Filed Aug. 13, 1947  2 Sheets-Sheet 2

Inventor
CLARKE M. GILBERT
By
H. S. Mackey
Attorney

Patented Oct. 25, 1949

2,486,357

UNITED STATES PATENT OFFICE 2,486,357

REMOTE CONTROL SYSTEM

Clarke M. Gilbert, Chappaqua, N. Y., assignor to General Precision Laboratory Incorporated, a corporation of New York Application August 13, 1947, Serial No. 768,358

8 Claims. (Cl. 318—29)

1

The present invention relates to a remote control system particularly adapted to sequentially position a single output mechanism in exact accord with the predetermined setting of a plurality of separate input mechanisms.

In various types of recorders and plotting devices, it is frequently desirable to record or otherwise display a plurality of records on a single chart or record strip by a single recording mechanism. The instant invention accomplishes these desirable results by the provision of a system whereby a plurality of separate inputs are sequentially connected to a circuit which then operates to successively position an output mechanism in exact relationship to the predetermined setting of the successively connected inputs.

More specifically the present invention contemplates the provision of a single servo system wherein a plurality of input voltages are derived which are proportional to the positions of each of a plurality of input mechanisms, which may be manually controlled dials, valves, gauges or any other elements, the relative positions of which are to be repeated, indicated and/or recorded at a single remote point. Each of the input voltages so derived is successively impressed on the input of the servo system by a sequential switching arrangement which is designed to operate in the desired time relationship, that is, each of the separate input voltages may be impressed on the system in rapid succession allowing only enough time for the output mechanism to assume the proper position in each case, or definite and predetermined time intervals may be allowed to elapse between successive switching operations depending on the particular application to which the invention is put.

In either case at successive time intervals a selected input voltage is applied to the system and this voltage is compared to another voltage whose value is directly dependent on the position of an output mechanism. The comparison of these two voltages in a bridge network produces a direct current "error voltage" which by suitable means is converted to an equivalent alternating current voltage and amplified to provide the motive power for positioning the output mechanism thru suitable driving means. The value of the "error voltage" and hence the motive power or torque available for positioning the output mechanism tends at all times to be proportional to the difference in positions between the input mechanism selected by the switching means and the output mechanism, that is to say a large relative difference in positions of input and output

2 mechanisms produces a large "error voltage" and hence a large driving torque, while smaller differences produce relatively smaller "error voltages" and driving torques and at exactly corresponding positions no "error voltage" is produced and hence no driving torque is available.

Neglecting for the moment the question of inertia, it will be apparent that when an input is suddenly applied to the system thru the action of the switching arrangement and the output mechanism is positioned at that instant at a location other than is desired, a torque proportional to the difference between actual and desired positions will be applied which tends to drive the output mechanism to the desired location and which will decrease as the desired location is neared until at the proper point no torque is applied and the mechanism stops.

Inertia effects, however, tend to upset this ideal operation and this is particularly true in the system of the present invention where sudden and radical changes of input voltage may be applied which tend to produce large operating torques. When a large torque is applied to the driving means it tends to overrun the zero or true positioning point which results in an "error voltage" of reverse value being applied to the system causing a reversal of motion and hence a hunting action of the output mechanism.

In the present invention means are incorporated to prevent such hunting action by the provision of circuit elements whereby changes in "error voltage" are anticipated and in some instances even reverse torques may be applied to the driving means just prior to the positioning of the operating mechanism at the proper point thereby acting as a braking force to prevent over-running the output mechanism and hence hunting action thereof.

Additionally the instant invention provides means for preventing the application of too large an "error voltage" which would tend to saturate the system. Where, as here, successive inputs are selectively switched into the circuit of the system, succeeding inputs may radically differ resulting in the production of "error voltages" which are greater than can be properly handled by the system. A feature of the prevent invention, therefore, resides in the provision of limiting means so arranged that under no circumstances can the "error voltage" impressed on the system exceed a value which will saturate the amplifier used therein.

The exact nature of the invention will be more clearly understood by reference to the following detailed description taken together with the attached drawings, in which.

Figure 1:
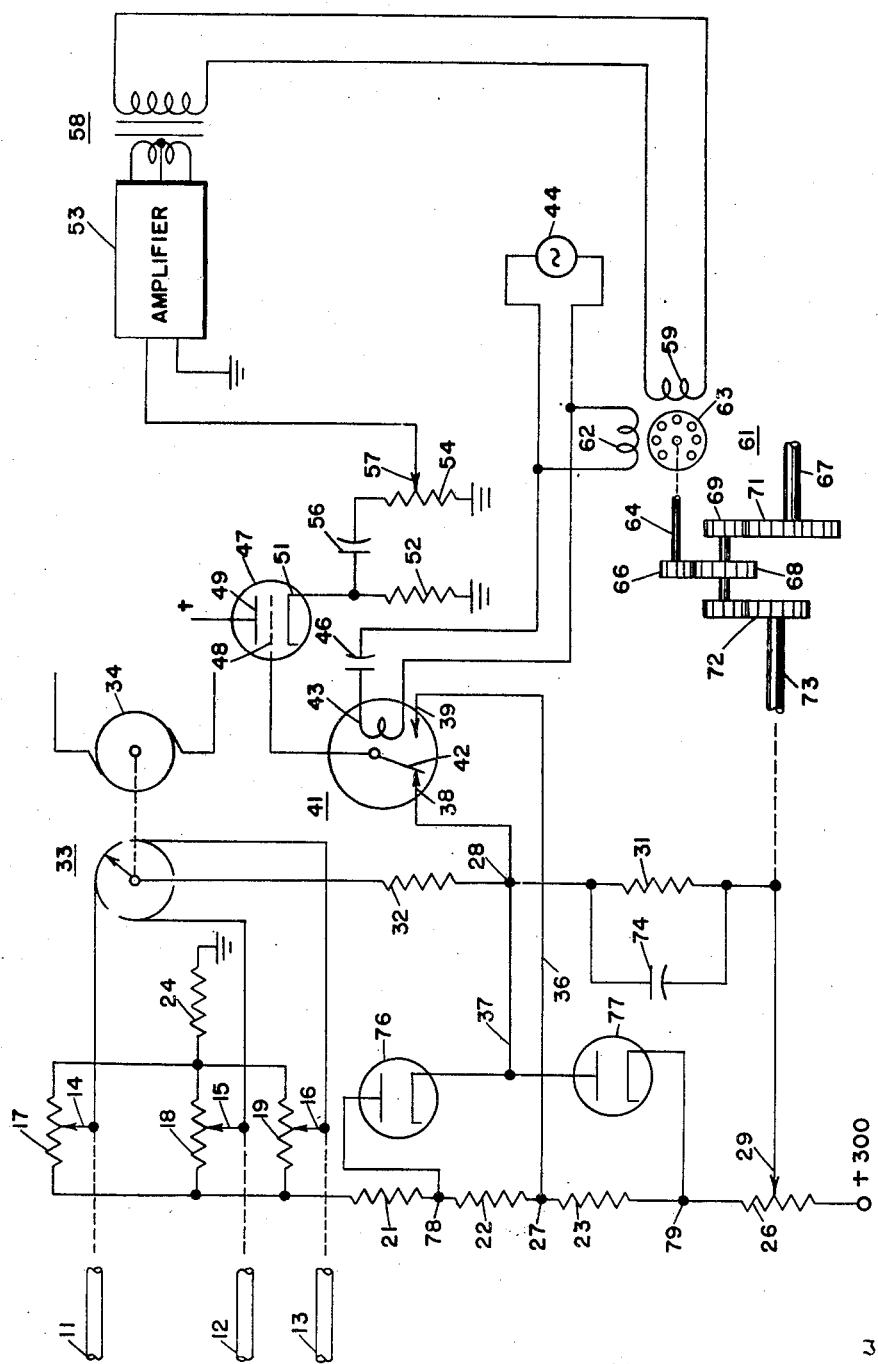
Figure 1 is a schematic diagram of one form of the invention.

Referring to Fig. 1 there is disclosed a plurality of shafts 11, 12 and 13 operatively connected to movable contacts 14, 15 and 16 of potentiometers 17, 18 and 19. Shafts 11, 12 and 13 may be positioned in any desired manner depending on any one of the various applications to which the system may be adapted. For example, these shafts may be manually controlled for plotting preselected positions on a remotely located chart or for remotely actuating the tuning elements of a radio receiver, or they may be mechanically or electrically actuated by any suitable means in accordance with any operational conditions such as temperatures, pressures, movements of valves or the like, an indication of which is desired on a single record at a remote point. Likewise it is apparent that any number of such shafts and accompanying potentiometers may be used depending on the number of different indications or movements desired at the remote point.

The potentiometers 17, 18 and 19 are connected in parallel and one terminal of this parallel combination is connected to ground thru resistor 24 and the other to a circuit consisting of series connected resistors 21, 22, 23 and potentiometer 26. The opposite terminal of potentiometer 26 is connected to a source of direct current potential, for example, 300 volts, so that the entire network consisting of the parallel combination of potentiometers 17, 18 and 19, resistors 21—24 inclusive and potentiometer 26 constitute a potential divider having a fixed potential at terminal 27 and permitting variable potentials to be applied to movable contacts 14, 15 and 16 of potentiometers 17, 18 and 19 and movable contact 29 of potentiometer 26, these variable potentials, of course, being dependent on the positions of the respective movable contacts on their associated potentiometers.

Movable contact 29 is connected to one terminal of a series circuit consisting of resistors 31 and 32 and the other terminal of this series circuit is selectively connectable to each of the movable contacts 14, 15 and 16 thru the action of a commutator 33 actuated by a motor 34.

The series circuit composed of resistors 31 and 32 taken together with the potential divider composed of potentiometers 17, 18, 19 and 26 and resistors 21—24 inclusive forms a bridge circuit having as conjugate output terminals the terminal of fixed potential 27 and a terminal 28 whose potential varies above and below that of terminal 27 depending on the relative positions of movable contact 29 on potentiometer 26 and the particular one of movable contacts 14, 15 and 16 which may be connected in circuit at any instant of time by the commutator 33.

Conjugate output terminals 27 and 28 are respectively connected by conductors 36 and 37 to contacts 38 and 39 of an interrupter 41.

Interrupter 41 may conveniently consist of the aforementioned contacts 38 and 39 and a movable contact 42 which is caused to alternately engage said contacts by an actuating coil 43. Actuating coil 43 is energized by an alternating current source 44 thru a phase shifting condenser 46 so that the movable contact 42 is caused to engage and disengage contacts 38 and 39 at the frequency of the alternating current source 44. Contacts 38 and 39 and movable contact 42 are so adjusted and the interrupter 41 is so constructed that in what may be termed neutral position both contacts 38 and 39 are engaged by movable contact 42. Actuation of movable contact 42 in either direction under the influence of the actuating coil 43 causes the movable contact 42 and one contact to move away from the remaining contact, thereby breaking the circuit between the movable contact and one of contacts 38 or 39 but maintaining engagement with the other. By this arrangement, the movable contact is always in engagement with at least one contact and engagement is made with alternate contacts before the other is disengaged.

The movable contact 42 is connected to the grid 48 of a thermionic tube 47, operated as a cathode follower and there is impressed, therefore, on the grid 48 a potential whose amplitude is the difference between the potentials of terminals 27 and 28 and whose frequency is that of the alternating current source 44, which may be, and preferably is, the standard 60 cycle power supply. Because the actuating coil 43 is energized from the alternating current source 44 thru the phase shifting condenser 46, the potential applied to grid 48 is shifted in phase 90° with respect to that of source 44 and either lags or leads such potential depending on whether terminal 28 is of positive or negative polarity with respect to that of terminal 27.

The thermionic tube 47 has its anode 49 connected directly to a source of positive potential, not shown, and its cathode 51 connected to ground thru a resistor 52. This tube, therefore, acts in the manner of a so-called "cathode follower" and the square wave pulsations impressed on the input thereof thru operation of the interrupter 41 produce a corresponding pulsating potential across resistor 52. Because the interrupter 41 is designed as above-described so that the grid 48 is never open circuited, no grid resistor is required and none is used.

The output of the thermionic tube 47 is coupled to an amplifier 53 thru a coupling network consisting of resistor 54 and coupling condenser 56, the variable tap 57 on resistor 54, constituting a manual gain control for the system.

The amplifier 53 may be of the well-known types, heretofore available to those skilled in the art and the output thereof is connected by means of transformer 58 to one field coil 59 of a two phase motor 61. The other field coil 62 is connected to and receives its energy from the alternating current source 44.

The rotor 63 of the motor 61 is mechanically coupled thru the medium of shaft 64 and suitable gearing diagrammatically indicated at 66, 68, 69 and 71 to an output shaft 67 which may be connected to any desired operating mechanism, such as a recorder, plotting device, or tuning shaft of a radio receiver, to name but a few examples of the many applications to which the invention may be put. Additionally, the rotor 63 is mechanically connected thru shaft 64 and a suitable gear train 72 to shaft 73 which is mechanically connected to position movable contact 29 on potentiometer 26.

To position the output shaft 67 and hence the output mechanism connected thereto in accordance with the relative position heretofore accorded to a selected one of the input shafts 11, 12 or 13 so much of the system as has thus far been described operates as follows:

The potential of terminal 27 is fixed since this terminal is located on a potential divider composed of resistors 21 to 24 inclusive and potentiometers 17, 18, 19 and 26 all being fixed resistances connected across a fixed potential source. The potential of terminal 28, however, is variable, depending on the relative displacement of the movable contact 29 and a selected one of contacts 14, 15 and 16. If for example, resistors 31 and 32 are of equal value, the potential of terminal 28 will be half the sum of the potentials at movable contact 29 and the selected one of contacts 14, 15 and 16 and this potential may be equal to, greater than or less than the potential of terminal 27, depending on the balance or unbalance of the bridge network and the direction of unbalance, if in that condition.

Assume now for the purposes of explanation, that the movable contact 16 is connected to the bridge network by commutator 33 as indicated in Fig. 1 and that the relative displacements of contacts 29 and 16 are such as to produce an unbalance condition, that is that half the sum of the potentials at these contacts is different than the fixed potential at terminal 27. There will be then, a difference in direct current potential between terminals 27 and 28 and hence a difference in potential between contacts 38 and 39 of interrupter 41.

This difference in direct current potential is converted to a square wave fluctuating potential by the alternate engagement and disengagement of contacts 38 and 39 by the movable contact 42 under the influence of the actuating coil 43 energized by the alternating current source 44. Furthermore, the phase of this fluctuating potential so produced is shifted with respect to the potential of the source 44 by the inclusion of a phase shifting element such as condenser 46 connected in the energization circuit of actuating coil 43.

The fluctuating current produced by the interrupter 41, which has an amplitude equivalent to the difference in potential between terminals 27 and 28 and which is of one phase or of opposite phase depending on whether the potential of terminal 28 is larger or smaller than the potential of terminal 27, is impressed on the grid of tube 47, repeated thereby, and amplified by amplifier 53. The amplified potential is in turn impressed on field coil 59 of the motor 61 and since this potential is shifted in phase from the potential of the supply source which is applied to the other field coil 62 of the motor, the motor will be caused to revolve in one direction or the other depending on whether the potential applied to field coil 59 is of one phase or of opposite phase.

The motor 61 on being actuated by the application of energy to field coil 59, drives output shaft 67 thru appropriate gearing and also drives shaft 73 which is operatively connected to movable contact 29 on potentiometer 26 and movable contact 29 is actuated in a direction which tends to rebalance the bridge network. When the motor 61 has revolved to such an extent as to position contact 29 at such a point on potentiometer 26 that the potential existing between contact 29 and fixed terminal 27 is equal to that existing between contact 16 and fixed terminal 27, one half of the sum of these potentials which are applied to the series resistors 31 and 32, that is, the potential of terminal 28, is equal to the potential of terminal 27 and the system is in balance. Under such conditions of operation since no potential difference, or "error voltage" exists between terminals 27 and 28 and there is no voltage to be converted, amplified and impressed on coil 59 of the motor 61 the de-energization of field coil 59 causes the motor to stop.

At every position of one of the input shafts 11, 12 or 13 and hence contacts 14, 15 and 16 therefore, there is an equivalent position for contact 29 and hence motor 61 and output shaft 67 and the output mechanism which may be connected thereto is caused to accurately follow the motion heretofore accorded the input mechanisms connected to the various shafts.

In describing the operation of the system so far, it has been assumed that no inertia is present and that any amount of "error voltage" input might be impressed on the amplifier without over-saturation thereof. This is, of course, not the case in any practical system and hence in the present system additional elements are incorporated which avoid or correct for the deleterious effects that would otherwise be produced as a result of inertia and the practical limits as to the capacity of an amplifier such as 53.

Considering first the question of inertia, it will be apparent from the above description of the operation of the system that as the motor 61 is revolved and the contact 29 approaches the proper point to balance the system and stop the motor, the "error voltage" and hence the energy applied to field coil 59 will be reduced and the motor will tend to slow down. Because a certain amount of inertia is present, however, the speed of the motor will not directly vary as its energization and instead of stopping at a point which would position contact 29 so as to exactly balance the system, the contact may be caused to ride past this point producing an unbalance in the opposite direction resulting in the motor reversing itself and oscillating or hunting about the proper position before it comes to rest.

This results in a slowing of the proper positioning operation to such an extent as not to be tolerated and the present invention therefore incorporates features which in effect anticipate changes in speed of the motor so that it is brought smoothly and accurately to its proper position without oscillation or hunting action.

This is accomplished by connecting a condenser 74 across resistor 31 so that resistors 31, 32 and condenser 74 form a phase lead network.

In the operation of the system discussed above, it was assumed that the potential of terminal 28 was at all times equal to one half of the sum of the potentials applied across the series resistors 31 and 32 and that hence at every instant of time the "error voltage," the difference in potential between terminal 28 and terminal 27, was directly related to the relative positions of the selected input contact and output contact 29. This assumption now requires re-examination in view of the effect produced by the phase lead network.

The condenser 74 requires time to charge or discharge thru resistance 31 and hence there is a tendency to maintain the same potential difference across resistance 31, and hence between terminal 28 and contact 29, even though the contact 29 is being moved by motor 61 so as to change the potential applied across resistors 31 and 32 connected in series. The change in potential across resistors 31 and 32 will not be equal, and equivalent to one-half the sum of the change across the entire series circuit but will be greater across resistance 32 than across resistance 31 and the potential of terminal 28 will tend to follow and vary in the same direction as the potential of contact 29, this tendency being increased the greater the speed of the motor 61. The "error voltage," that is, the difference in potential between terminals 28 and 27 is therefore made less than it would be in the absence of the condenser 74 and furthermore, the amount thereof decreases as the speed of the motor increases being even caused to reverse under certain conditions before the balance point is reached so that a braking effect is applied to the motor, thereby cancelling and compensating for the effects of inertia.

To provide a system wherein an amplifier of reasonable capacity may be used without resulting in over-saturation thereof under some conditions of operation, the present invention incorporates means for limiting the value of the "error voltage" under any possible conditions of operation.

To provide this limiting action, diodes 76 and 77 are connected in series across resistors 22 and 23 and the common terminal of this diode circuit is connected to terminal 28. By this means regardless of the amount of unbalance of the system, which at times may be quite high, when for example, the system is switched by commutator 33 from one input to another which is radically different, the potential of terminal 28 is allowed to differ from that of terminal 27 by no more than the potential drop across resistor 22 or resistor 23.

Any tendency towards a greater difference in potential between these terminals will cause one or the other of diodes 76 or 77 to conduct thereby bringing the potential of terminal 28 to a value substantially equal to that of terminal 78 or 79 as the case may be. Resistors 22 and 23 are selected of such a value that the "error voltage" is limited to a value which will just saturate the output stage of the amplifier 53 and in this way no "error voltage" can be impressed on the system which is greater than the capacity of such system.

In the disclosure of Fig. 1 resistors 21 and 24 are illustrated as connected in the potential divider network which is composed of the input and output potentiometers and the limiting resistors above-described. These resistors 21 and 24 are not absolutely essential to the operation of the system but are found to be advantageous in limiting the potential range over which the input potentiometers are adjusted so that if a setting occurs at or near the end of the input potentiometer any overshoot of the output potentiometer will not drive the contact 29 across the gap of the potentiometer to the opposite end of the winding 26 thereby resulting in the motor being required to drive the contact 29 for nearly a complete revolution to attain balanced conditions.

Instead of resistors 21 and 24 which constitute slight limitations on the range of movement of contact 29, the same effect may be accomplished by limiting the range of adjustment of the input potentiometers by the use of stop pins so that the movable contact will not quite reach the ends thereof.

As an alternative to the vibrating interrupter 41 disclosed in Fig. 1 the same results may be accomplished by the use of a thermionic tube circuit necessitating no moving contacts.

Figure 2:
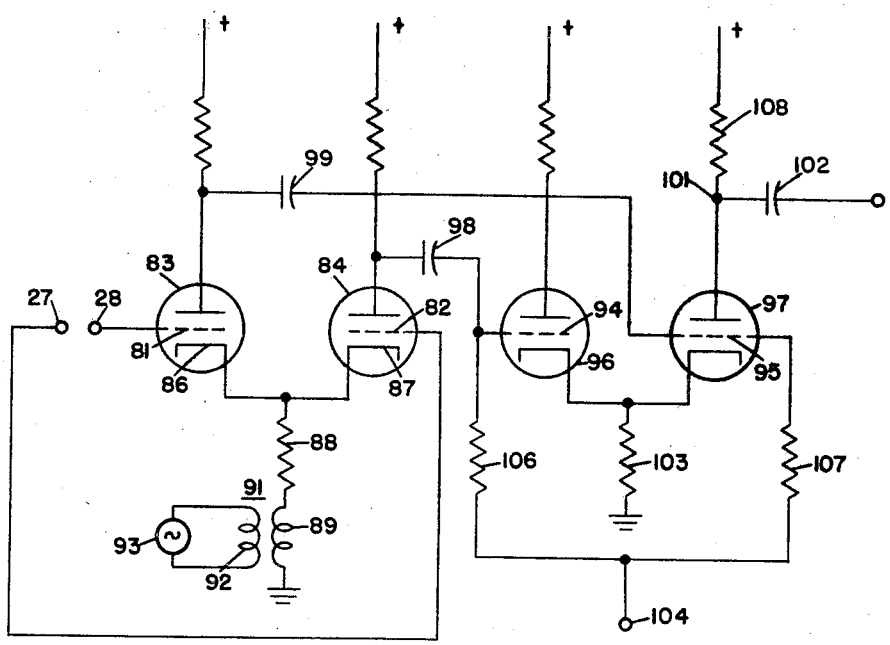
Figure 2 illustrates an alternative circuit for converting the direct current "error voltage" to a useable alternating current voltage.

Such an alternative is illustrated in Fig. 2 and for the sake of simplicity and ease in understanding only so much of the circuit is illustrated as constitutes a modification of the complete system disclosed in Fig. 1. As in the system disclosed in Fig. 1 terminals 27 and 28 constitute the points from which the "error voltage" is derived by the same means as has heretofore been described.

The potentials so obtained are respectively impressed on grids 81 and 82 of thermionic tubes 83 and 84. The cathodes 86 and 87 of these tubes are connected together and thru a resistance 88 to the secondary 89 of a transformer 91 and thence to ground. The primary 92 of transformer 91 is connected to a source of alternating current 93, which may be the usual power mains and hence there is imposed upon the direct current potential derived from terminals 27 and 28, i. e., the "error voltage" an alternating potential which thru the action of the tubes will produce respective alternating potential outputs whose amplitude is proportional to the direct current potential of terminals 27 and 28 impressed on the respective grids 81 and 82.

The alternating outputs so produced are impressed on grids 94 and 95 of tubes 96 and 97, thru coupling condensers 98 and 99. Tubes 94 and 95 have their cathodes connected together and to ground thru a common resistor 103 and their grids connected to a source of biasing potential, diagrammatically indicated by terminal 104, thru resistors 106 and 107. Tubes 96 and 99 therefore constitute a differential amplifier the output of which derived from the anode circuit of tube 97 may be impressed on further amplification stages such as amplifier 53 of Fig. 1 thru coupling condenser 102 and utilized in the same manner thru the same instrumentalities as disclosed in the system of Fig. 1 to position an output mechanism.

The operation of the circuit of Fig. 2 is as follows:

Assuming that an unbalance condition exists, that is, that the relative potentials of terminals 27 and 28 are different, that is, that an "error voltage" exists, and further assume that the potential of terminal 28 is higher than that of terminal 27. There exists then, between grid 81 and cathode 86 of tube 83 a decrease in bias potential which will produce an increased plate current in tube 83 and this plate current is made to fluctuate by the superposition of an alternating potential in the secondary of the transformer 89. An increase in plate current in tube 83, however, increases the potential drop across resistor 88 common to the input and output circuits of both tubes and hence increases the positive potential of cathodes 86 and 87. Since the cathode 87 is thus increased in potential in a positive direction, the relative potential difference between cathode 87 and grid 82 increases by an amount equal to the decrease in potential difference between grid 81 and cathode 86 and the plate current of tube 84 decreases by an amount equal to the increase in plate current of tube 83 and a differential action is thereby attained.

Signals which are the result of this differential action, that is one constituting an increase in amplitude and the other a corresponding decrease are obtained from the anode circuits of tubes 83 and 84 and separately applied to the grids 94 and 95 of a pair of tubes 96 and 97 forming a differential amplifier which operates in the same manner as described in connection with tubes 83 and 84.

That is, the use of the common resistor 103 in the inputs and outputs of both tubes 96 and 97 causes the cathodes thereof to float in potential and an increase in plate current in one tube will result in a corresponding decrease in plate current of the other. The variable potential available at terminal 101, therefore, is a function of the difference in potential existing between terminals 27 and 28 and may be utilized after further suitable amplification to operate the output mechanism and the means to rebalance the system.

Figure 3:
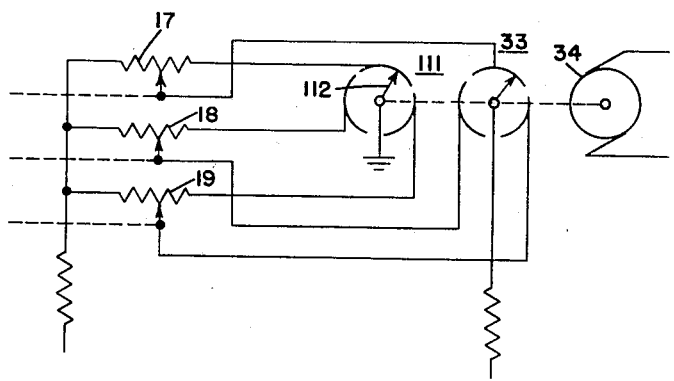
Figure 3 illustrates an alternative arrangement for connecting the input voltages to the system.

As a modification of the switching system for connecting the various input potentiometers to the bridge network, the system disclosed in Fig. 3 may be used.

In the switching system of Fig. 1 all of the potentiometers are connected in parallel and permanently in the potential divider circuit, the cummutator 33 merely selectively connecting the movable contacts of the several potentiometers to the bridge circuit. Such a system has the disadvantage that more current is required and the resistance values of the several potentiometers must be greater in proportion to the number used than the resistance value of the output potentiometer.

The system of Fig. 3 avoids these particular disadvantages by the use of an additional commutator or switching mechanism 111 operatively connected to the motor 34 and commutator 33. The movable contact 112 is connected to ground either directly or through a resistance such as resistance 24 of Fig. 1 and the commutator segments are respectively connected to the several potentiometers 17, 18 and 19. By this means only that potentiometer is connected to the potential divider circuit which at any instant of time is to act as the input for the system and less current drain is experienced and the input and output potentiometers may be of equal value.

The only disadvantage experienced by such an arrangement is that an extra commutator or switching mechanism 111 is required but this disadvantage may be outweighed by the other advantages attained particularly where a large number of inputs are utilized. On the other hand, where the number of inputs is more limited, the system of Fig. 1 may be found to be the more feasible. the particular application to which the system is put in most cases controlling the choice of one or the other arrangement.

In describing the system and various modifications and alterations thereof, the switching mechanism 33 has been generally referred to as a commutator, it will be understood however, that other equivalent switching mechanisms may be used such as switch operated cams electronic switching and the like.

Furthermore where the system is used as a remote time controlled tuning means for a radio receiver, or the like, the motor 34 may be a timing device such as a clock motor and the switching mechanism controlled thereby may be any device which will establish any one of a plurality of circiuts at any particular time depending on the selective actuation of preset switching members.

What is claimed is:

1. In a control system for positioning an output mechanism to selected positions by a plurality of remotely located separate input mechanisms, reversible motor means for positioning said output mechanism, a bridge circuit including a plurality of input potentiometers each having their movable contacts operatively connected to separate ones of said input mechanisms, an output potentiometer having its movable contact operatively connected to said reversible motor means and to said bridge circuit, a source of direct current potential for said bridge circuit, selective switching means for successively connecting the movable contacts of said input potentiometers in said bridge circuit whereby the direct current potential impressed across the output terminals of said bridge circuit is a function of the relative displacement of the movable contact of said output potentiometer and the selected movable contact of said input potentiometer thereby producing a direct current "error voltage," means for converting said direct current "error voltage" to an alternating current "error voltage" of equivalent phase and amplitude, means for energizing said reversible motor means including said alternating current "error voltage" whereby said motor means is caused to operate in a direction and at a speed dependent on the phase and amplitude of said alternating current "error voltage" reactance means connected in said bridge circuit for varying said direct current "error voltage" in accordance with the speed of said reversible motor means to prevent hunting thereof and means connected in said bridge circuit for limiting the amplitude of said direct current "error voltage."

2. A control system as defined in claim 1 in which said means for limiting the amplitude of said "error voltage" comprises a pair of resistors serially connected in one branch of said bridge circuit, the common terminal thereof forming one of the output terminals of said bridge circuit, a pair of serially connected unidirectional conductive devices connected in parallel to said pair of resistors and having their common terminal connected to the other output terminal of said bridge circuit whereby the potential developed between said output terminals is substantially limited to the potential drop across one or the other of said pair of resistors.

3. A control system as defined in claim 2 in which said means for converting said direct current "error voltage" to an alternating current "error voltage" comprises an interrupter having a pair of contacts each of which is connected to one of the output terminals of said bridge circuit, a vibrating contact alternately engaging and disengaging said pair of contacts, an actuating coil therefor, an energizing circuit for said actuating coil including an alternating current source and phase shifting means in said energizing circuit.

4. In a control system for positioning an output mechanism to selected positions by a plurality of remotely located separate input mechanisms, reversible motor means for positioning said output mechanism, a bridge circuit including a plurality of input potentiometers each having their movable contacts operatively connected to separate ones of said input mechanisms, an output potentiometer having its movable contact operatively connected to said reversible motor means and to said bridge circuit, a source of direct current potential for said bridge circuit, selective switching means for successively connecting the movable contacts of said input potentiometers in said bridge circuit whereby the direct current potential impressed across the output terminals of said bridge circuit is a function of the relative displacement of the movable contact of said output potentiometer and the selected movable contact of said input potentiometer thereby producing a direct current "error voltage" in the output of said bridge circuit, first and second thermionic tubes each having at least anode, cathode and grid electrodes, a connection between one of the output terminals of said bridge circuit and the grid of said first thermionic tube, a connection between the other output terminal of said bridge circuit and the grid of said second thermionic tube, a common cathode circuit for said first and second thermionic tubes including a resistor and a source of alternating current potential connected between said cathodes and ground whereby the direct current "error voltage" produced in the output of said bridge circuit is converted to an alternating current "error voltage" of equivalent phase and amplitude, means for energizing said reversible motor means including said alternating current "error voltage" whereby said motor means is caused to operate in a direction and at a speed dependent on the phase and ampliude of said alternating current "error voltage," reactance means connected in said bridge circuit for varying said direct current "error voltage" in accordance with the speed of said reversible motor means to prevent hunting thereof, and means for limiting the amplitude of said direct current "error voltage."

5. A control system as defined in claim 4 including a differential amplifier connected to the anode circuits of said first and second thermionic tubes.

6. A control system as defined in claim 5 in which said reactance means for varying the "error voltage" in accordance with the speed of the reversible motor, includes a condenser and resistance connected in parallel.

7. A control system as defined in claim 6 in which said means for limiting the amplitude of said "error voltage" comprises a pair of resistors serially connected in one branch of said bridge circuit, the common terminal thereof forming one of the output terminals of said bridge circuit, a pair of serially connected unidirectional conductive devices connected in parallel to said pair of resistors and having their common terminal connected to the other output terminal of said bridge circuit whereby the potential developed between said output terminals is substantially limited to the potential drop across one or the other of said pair of resistors.

8. In a control system for positioning an output mechanism to selected positions in accordance with the positions of a plurality of remotely located input mechanisms, a reversible motor for positioning said output mechanism, a plurality of input potentiometers each having its movable contact mechanically actuated by a selected input mechanism, an output potentiometer having its movable contact mechanically actuated by said reversible motor, a source of direct current potential, a series circuit comprising said input potentiometer, said output potentiometer and a pair of resistors connected between adjacent ends of said input potentiometer and said output potentiometer connected in shunt to said source of direct current potential, a second pair of resistors connected in series between the movable contact of said output potentiometer and a movable contact of a selected input potentiometer, a condenser connected in shunt to one of said second pair of resistors, a pair of serially connected rectifiers connected in shunt to said first mentioned pair of resistors, a direct connection between the juncture of said serially connected rectifiers and the juncture of said second pair of resistors, a circuit for deriving a direct current "error voltage" connected to the juncture of said first mentioned pair of resistors and the juncture of said second pair of resistors, means for converting said direct current "error voltage" to an alternating current "error voltage" of equivalent amplitude and of a phase dependent on the sense of said direct current "error voltage" and means for operating said reversible motor at a speed and in a direction dependent on the amplitude and phase of said alternating current "error voltage."

CLARKE M. GILBERT.

REFERENCES CITED

The following references are of record in the file of this patent:

UNITED STATES PATENTS

| Number | Name | Date |
|---|---|---|
| 2,135,991 | Nessell | Nov. 8, 1938 |
| 2,367,746 | Williams | Jan. 23, 1945 |
| 2,388,769 | Shaffer | Nov. 13, 1945 |
| 2,423,540 | Wills | July 8, 1947 |
| 2,439,198 | Bedford | Apr. 6, 1948 |

FOREIGN PATENTS

| Number | Country | Date |
|---|---|---|
| 552,118 | Great Britain | Mar. 24, 1943 |